United States Patent [19]

Boschman

[11] Patent Number: 5,411,170

[45] Date of Patent: May 2, 1995

[54] SYSTEM FOR METERED FEEDING OF CYLINDRICAL BODIES FROM A STOCK TO A PROCESSING MACHINE

[75] Inventor: Everardus H. Boschman, Aerdt, Netherlands

[73] Assignee: Boschman Holding B.V., Nijmegen, Netherlands

[21] Appl. No.: 155,138

[22] Filed: Nov. 22, 1993

[30] Foreign Application Priority Data

Nov. 24, 1992 [NL] Netherlands ................ 9202042

[51] Int. Cl.⁶ ........................................... B23Q 7/12
[52] U.S. Cl. ................................. 221/167; 221/157;
221/263; 221/225; 221/234; 221/236
[58] Field of Search ............... 221/156, 157, 158, 160,
221/161, 162, 167, 169, 170, 263, 264, 265, 266,
224, 225, 234, 235, 236

[56] References Cited

U.S. PATENT DOCUMENTS 1,398,351  11/1921  Williams ......................... 221/224 X
1,603,814  10/1926  Stimpson ........................ 221/169
2,707,576   5/1955  Fowler ............................. 221/169 X
4,101,284   7/1978  Difiglio et al. ................. 221/264 X

FOREIGN PATENT DOCUMENTS 2575399  7/1986  France .
WO93/01022  1/1993  WIPO .

Primary Examiner—Cheryl L. Gastineau
Assistant Examiner—Dean A. Reichard
Attorney, Agent, or Firm—Young & Thompson

[57] ABSTRACT

System for metered feeding of cylindrical bodies from a stock to a processing machine. This involves, starting from the stock, first aligning the cylindrical bodies and then feeding them in a metered manner to a transfer device in order to move the cylindrical bodies to the processing machine. According to the invention, the device for aligning the cylindrical bodies coming from the stock consists of a rotatable drum-shaped member consisting of a number of bars disposed in the form of a ring. Between the bars the opening through which the cylindrical bodies can emerge is delimited.

10 Claims, 8 Drawing Sheets

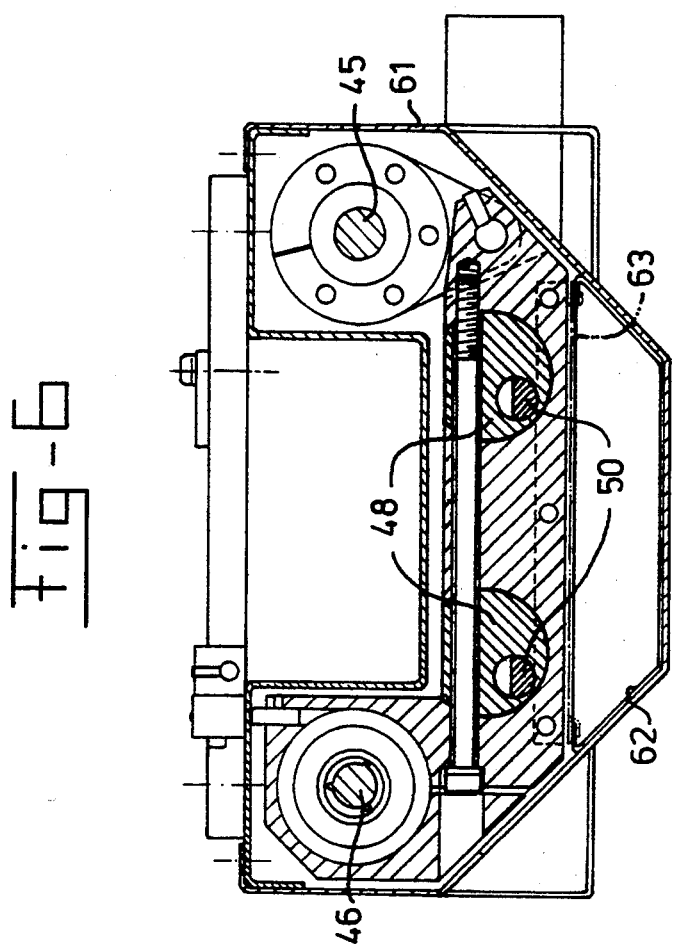

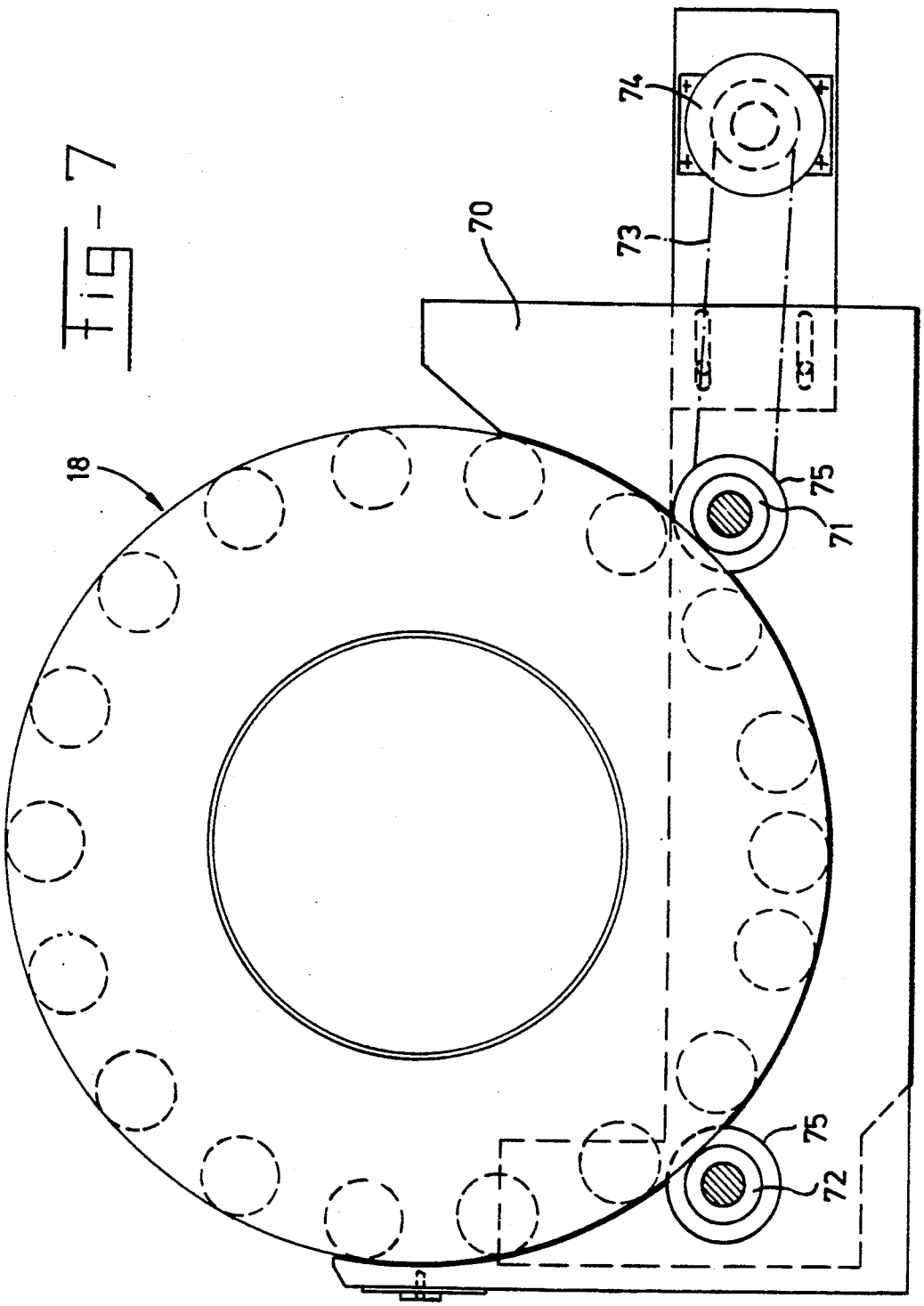

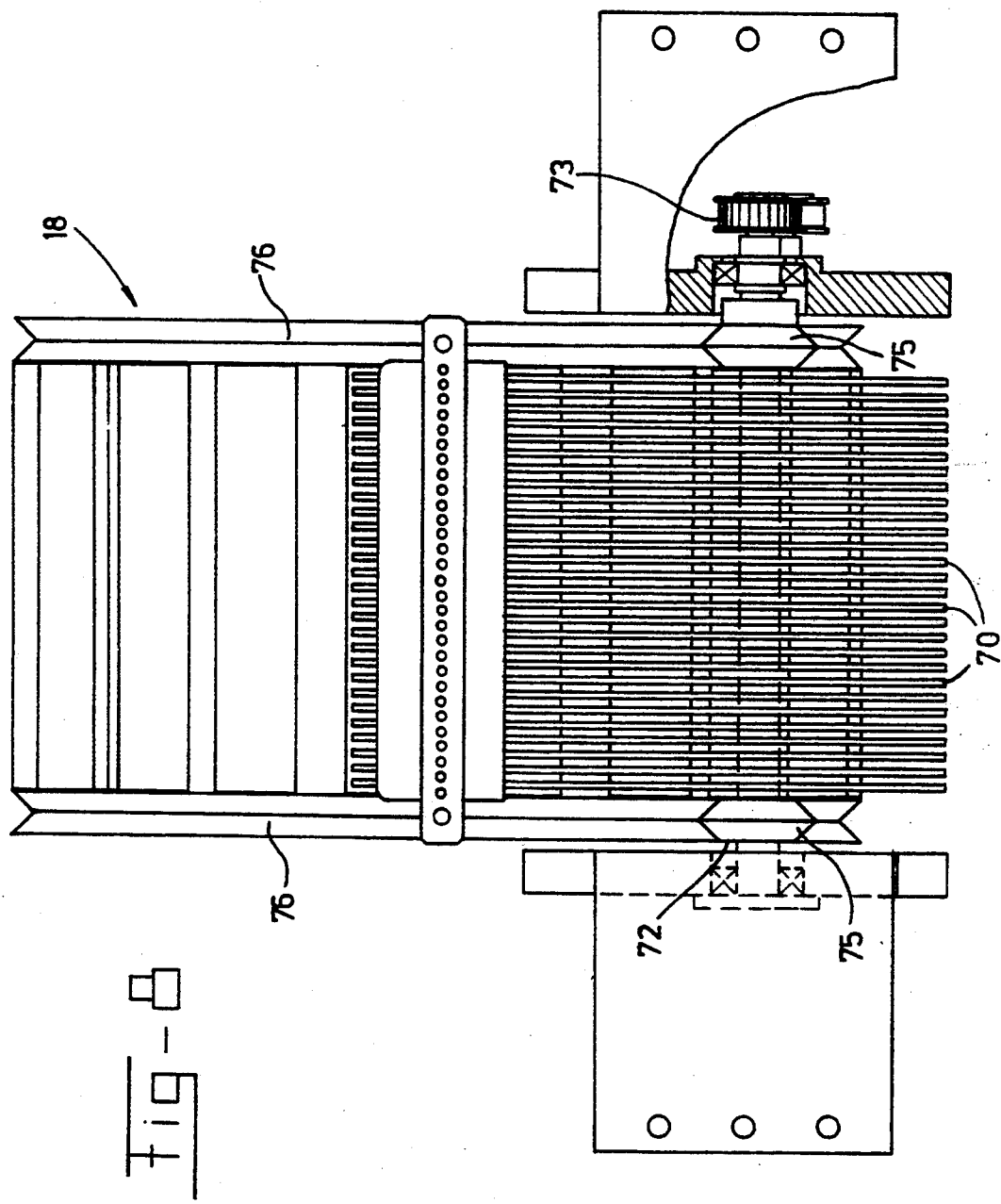

SYSTEM FOR METERED FEEDING OF CYLINDRICAL BODIES FROM A STOCK TO A PROCESSING MACHINE

BACKGROUND OF THE INVENTION

The invention relates to a system for metered feeding of cylindrical bodies from a stock to a processing machine, comprising a device for holding said stock; a device for aligning the cylindrical bodies coming from the stock; a device for metered feeding of the cylindrical bodies to a transfer device; and a transfer device to move the cylindrical bodies to the processing machine. A system of this type can in general be employed in all those cases where cylindrical bodies from a bulk stock have to be fed to processing machines in an aligned and metered manner.

A system of this type is generally known in the prior art. In that case, the device for aligning the cylindrical bodies coming from the stock comprises shaking and vibrating devices. Using such shaking and vibrating devices has various drawbacks. Firstly, the cylindrical bodies are damaged and, more importantly, the material removed from the cylindrical bodies will in part be converted into dust. Although dust is not harmful to this system, a system of this type will often be used in circumstances where a clean environment is an absolute requirement for other equipment. Thus, a system of this type is used in particular for encapsulating chips arranged in a lead frame. When encapsulating in such a manner, it is essential that no dust be present, because this may impair the functioning of the subsequently obtained encased chip or may partly remove the protection thereof.

SUMMARY OF THE INVENTION

The object of the present invention is to avoid this drawback and to improve in an abovedescribed system the device for aligning the cylindrical bodies coming from the stock in such a way that less dust is produced.

This object is achieved in a system described hereinabove by the device for aligning a cylindrical body coming from the stock comprising a rotatable drum-shaped member, consisting of a number of bars which are disposed in the form of a ring and whose longitudinal centre line is essentially parallel to the longitudinal centre line of the drum, there being a spacing between the bars, which corresponds to the thickness of the cylindrical bodies, the rotational centre line of the drum-shaped member being essentially horizontal, and screening means being disposed near the bottom half of the drum-shaped member and adjoining the latter, the inlet for cylindrical bodies being disposed near the centre of the drum-shaped member and the outlet for cylindrical bodies at the circumference of the bars, together with a motor for driving the drum-shaped member in a rotary manner.

It is found that, by means of the construction in which a rotatable drum is used in which the lateral surface consists of a number of spaced bars, alignment of the cylindrical bodies is ensured in a reliable manner. It is found that, if the outlet opening is chosen in a suitable manner, the cylindrical bodies, which are fashioned cylindrically, exclusively emerge with the longitudinal axis of the cylinder being parallel to the longitudinal centre line of the bars. In order to prevent the cylindrical bodies from dropping through the bars at the underside of the drum, screening means are present.

These preferably consist of a belt corevolving with the drum. According to an advantageous embodiment, said belt is at the same time the drive belt for the drum. As a result of the cylindrical bodies being aligned in this way, much less dust is produced. According to a preferred embodiment of the invention, dust exhaustion means are present near the outlet for the cylindrical bodies of the drum-shaped member, in case any dust is produced.

Further removal of dust can be obtained if the rotatable drum is driven and supported by two spaced rollers, the exposed lower part being protected by a lattice such as a number of spaced lamellae. In this arrangement, the lattice is dimensioned in such a way that the pellets in question cannot pass through it and cannot jam with the drum, but on the other hand the dust can flow out easily.

In addition to an improvement of the alignment means in the system described hereinabove, the invention also comprises improvements regarding the transfer device. According to the invention, this comprises a displaceable holder with accommodating means, which accommodating means comprise a continuous opening, which is situated near the underside thereof, extends mainly in a vertical direction, and is provided with a displaceable closure. According to a preferred embodiment, in which there are present in the holder various aligned accommodating means, the closure comprises an elongated rotatable member which extends perpendicularly with respect to the centre line of the openings and has a circumference which is not rotationally symmetric. Preferably, the holder can be displaced along a rod guidance system, means being present in the rod guidance system both for displacing the holder and means for unblocking or blocking the receptacles.

The invention will be explained below in more detail with reference to an illustrative embodiment depicted in the drawing, in which:

BRIEF DESCRIPTION OF THE DRAWINGS

FIG. 6 shows a cross-section according to FIG. 5;

FIG. 7 shows a detail of a modified embodiment of the drum-shaped member; and

FIG. 8 shows a top view of said modified embodiment of the drum-shaped member.

DESCRIPTION OF A PREFERRED EMBODIMENT

Figure 1:
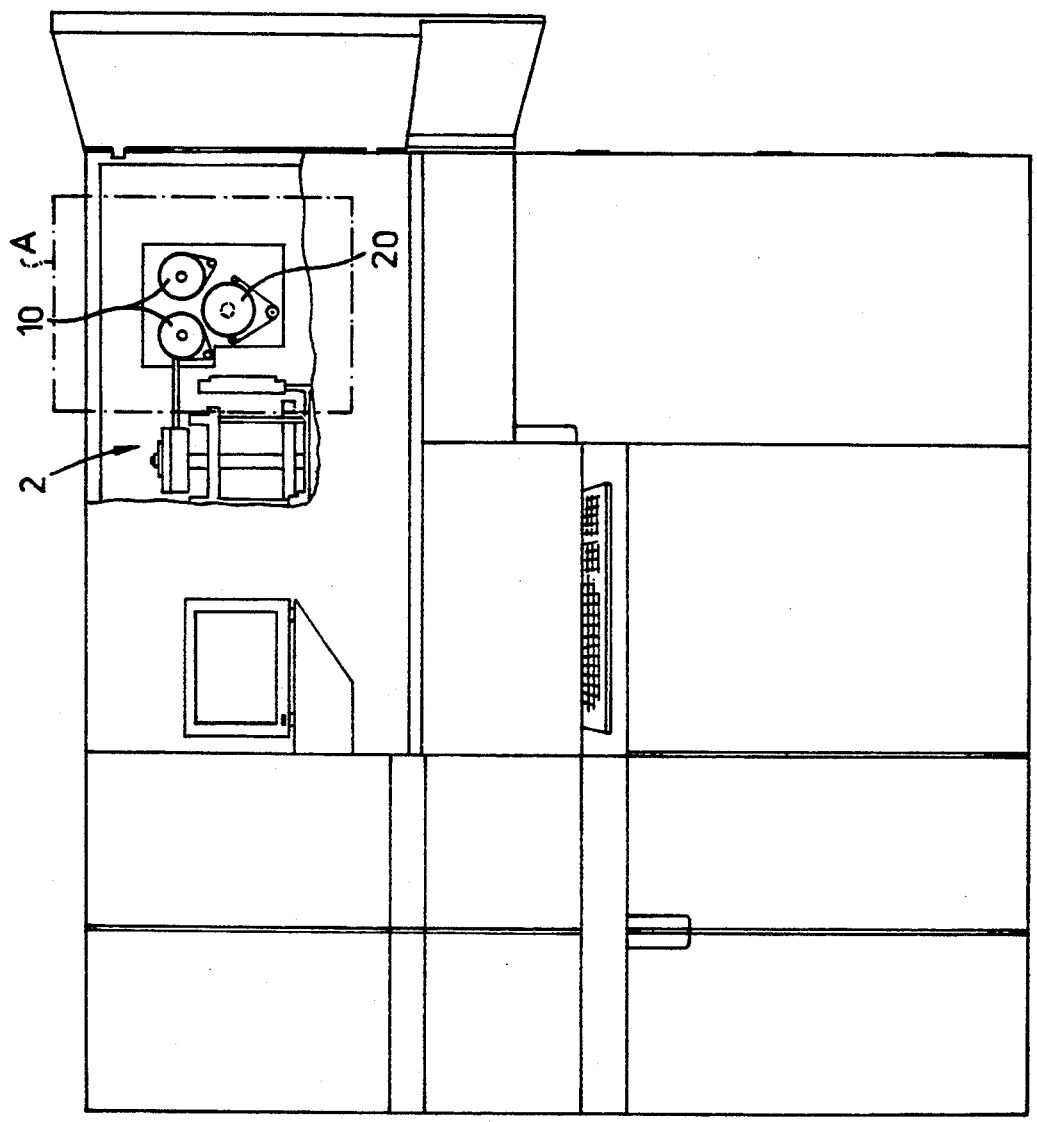
FIG. 1 shows a view of a device for encasing lead frames containing chips, by means of a plastic material.

A device for encapsulating a lead frame provided with a chip is designated in its entirety by 1 in FIG. 1. This device consists of a press 2, shown very schematically, for delimiting therebetween the injection cavity for plastic material, a supply (not shown in more detail) of lead frames with chips, a discharge thereof, and the part designated by A for feeding pellets to the melting and injecting device. A further processing device for the pellets is not shown in more detail.

When feeding in these pellets, it is important that they are introduced in a defined position and in a defined amount into the melting and injecting device. After all, the plastic is always melted and injected in a stepwise manner.

In order to accomplish this, the system for feeding plastic pellets to the melting and injecting device consists of a device for holding the stock, a device for aligning the pellets coming from the stock, a device for metered feeding of the pellets to a transfer device, and a transfer device to move the pellets to the melting and injecting device.

Figure 2:
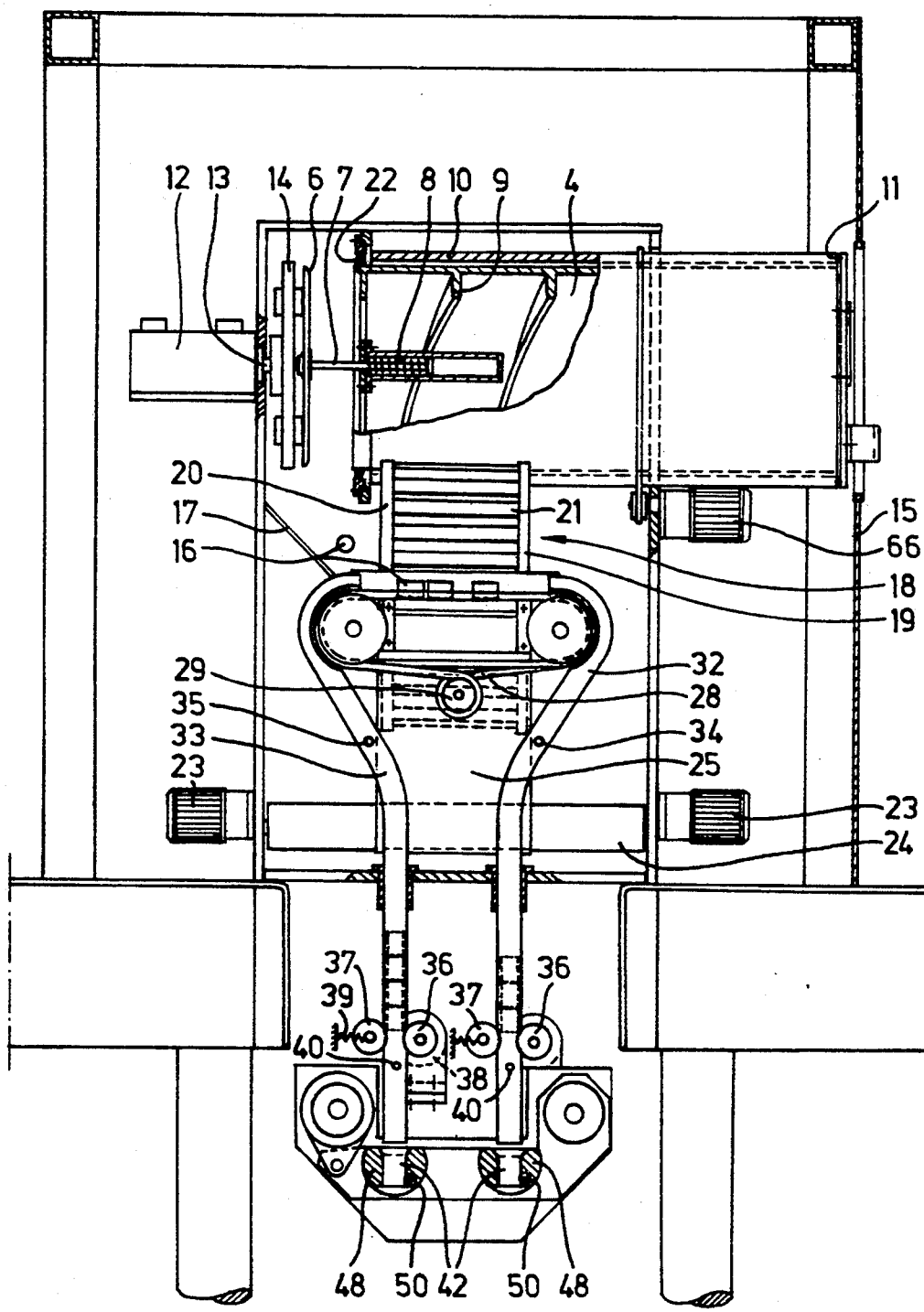
FIG. 2 shows a view and, in part, a sectional view of detail A according to FIG. 1 which relates to feeding plastic pellets to the melting and injecting device.

FIG. 2 shows that the stock of pellets is formed by two containers indicated by 4 in the drawing. Each container is provided on one side with a port 5 which can be closed by a valve 6. Valve 6 is designed, via stem 7 and spring 8, in such a way that, owing to the effect of spring 8, it attempts to move into a closed position. Valve 6 consists of ferromagnetic material. Arranged in container 4 there is a screw conveyor. Container 4 is accommodated within a sleeve 10. A seal is accomplished between sleeve 10 and the right-hand end of container 4 by means of an O-ring seal. Container 4 is driven to the left-hand side in FIG. 2 away from the O-ring 11 as a result of valve 6 being pulled to the left by electromagnet 12. A dust seal of container 4 is achieved by means of a brush part 22. Electromagnet 12 is secured to the device and has a displaceable armature 13 which is attached to a clutch plate 14. As a result of magnetic coupling of clutch plate 14 and valve 6, and subsequent leftward displacement, as shown in FIG. 2 on the left, firstly port 5 is unblocked and secondly the right-hand side of container 4 is pulled away from O-ring 11. If the container is empty, covet 6 will close as soon as electromagnet 12 is no longer actuated, and container 4 in FIG. 2 will move outwards to the right, so that one Tim thereof projects beyond the machine housing 15. This provides for a simple visual check of the charging operation. Container 4 is driven by means of coupling with sleeve 10, which sleeve 10 in turn is rotated by drive motor 66 with the aid of a belt in such a direction that the screw conveyor 9 is rotated in the sense of emptying container 4. The pellets 16 coming from container 4 drop via funnel 17 into the centre of a drum-shaped member indicated by 18. Said drum-shaped member 18 consists of a circular backplate 19, and a front ring 20 provided with the inlet port for pellets, between which a number of spaced bars 21 extends. In this arrangement, the spacing of the bars 21 is chosen in such a way that it corresponds with the diameter of the pellets 16.

Figure 3:
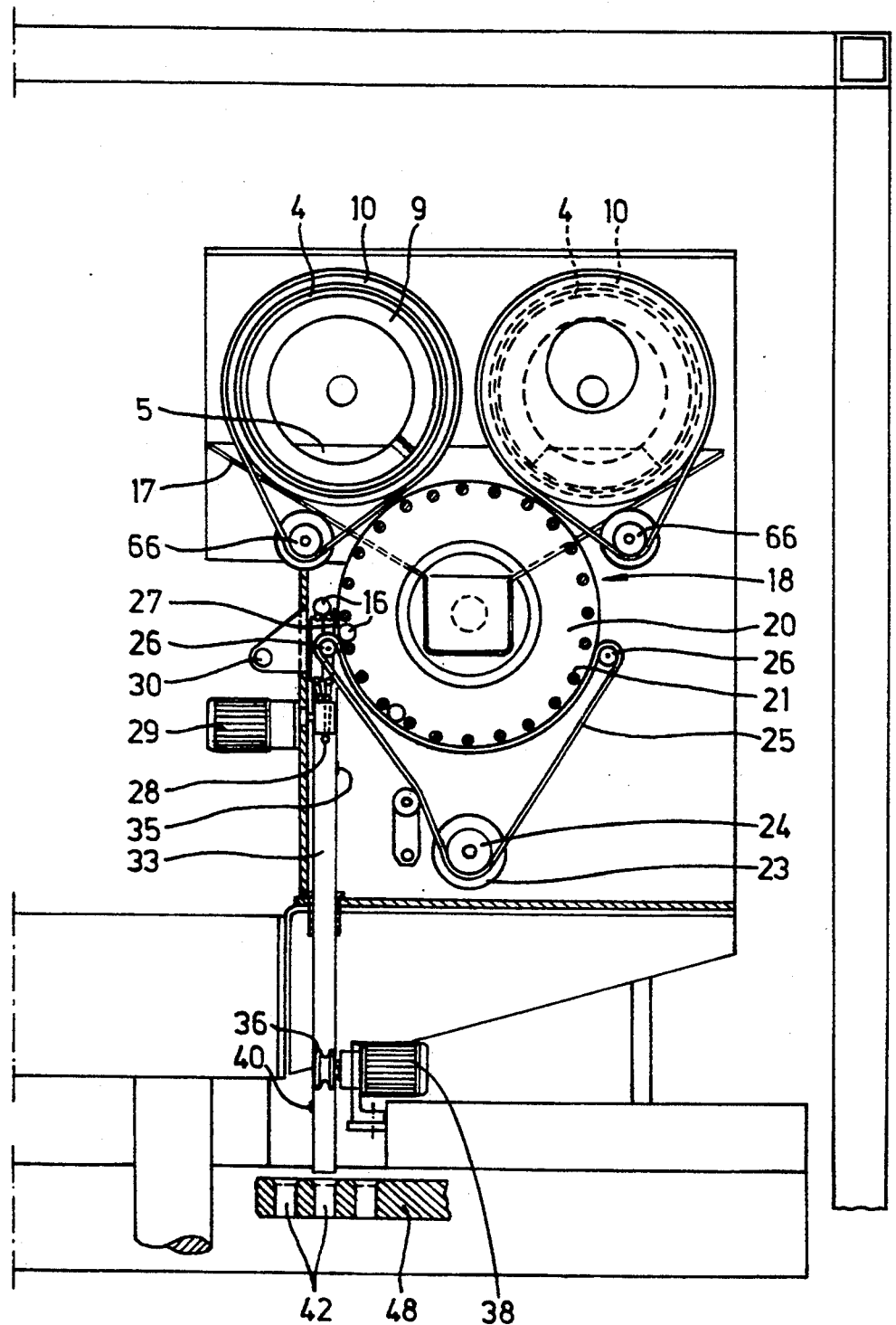
FIG. 3 shows a view and, in part, a sectional view of detail A according to FIG. 1, but in a position perpendicular to that shown in FIG. 2.

As a comparison of FIGS. 1 and 2 shows, two drive motors 23 are coupled via a shaft 24 around which a belt 25 revolves, which is wound around pulleys 26 in such a way that it drives the underside of drum 18. In this arrangement, the width of belt 25 is such that it also provides a seal at the underside of the drum. This means that, during rotation of drum 18, the bottom formed by belt 25 moves along as well, as a result of which the pellets situated in drum 18 ate subjected to the smallest possible relative movement, which prevents as fat as possible the formation of dust by external particles of the pellets being detached. The outlet of drum 8 is, as depicted in FIG. 3, bounded by a plate 27. Pellets 16 move outwards across plate 27 and ate then moved to a conveyor belt consisting of a double belt 28. This is likewise depicted in FIG. 3. Said endless belt 28 is driven back and forth by a motor 29. Near plate 27, a vacuum exhaustion system 30 is also present to remove directly the dust being released during the egress. With the aid of drive motor 29, the belt 28 can be moved in two directions, so that, as required, either tube 32 or tube 33 can be fed with pellets coming from the drum. The stock present in tubes 32 and 33 is detected by a level detector 34 and 35, respectively. As can be seen from FIG. 2, a stock of pellets 16 is located in tubes 33 and 32, and said tubes are sealed at the bottom by two wheels 36 and 37 positioned in the path of the tubes. In this arrangement, wheel 36 can be driven via motor 38, while wheel 37 in FIG. 2 can be displaced in a horizontal direction to the left or to the right against the force of a spring 39. As a result of motor 38 being driven, wheel 36 will rotate and pick up a pellet between itself and wheel 37, while wheel 37 will move to the left in FIG. 2 in order to let the pellet pass through. The passing-through of a pellet is then determined by means of an optical eye 40, the pellet then dropping into the receptacle 42 of the transfer device which serves to move the pellets to the melting and injecting device which is shown in more detail in FIGS. 4 and 5. In the design shown hereinabove, two containers are present which may act alternately. If one container is empty, it will move, as described hereinabove, outside the housing 15, so that its state is indicated. Whether or not a container is empty is detected by the level detectors 34, 35. If no pellet moves along one of the detectors 34, 35 when drum 18 and motor 29 rotate, the conclusion may be drawn after a while, that container 4 is empty, so that it is pushed off and the container adjoining thereto is activated. After this container has been filled, it may be placed in the device described above in the storage position. Using the part of the system described hereinabove permits alignment of a pellet without dust being released in the process, and feeding it to receptacles 42 in a metered manner. Outside the machine, the containers are sealed in a completely dustproof manner, so that it can be conveyed through a low-dust room without problems.

Figure 4:
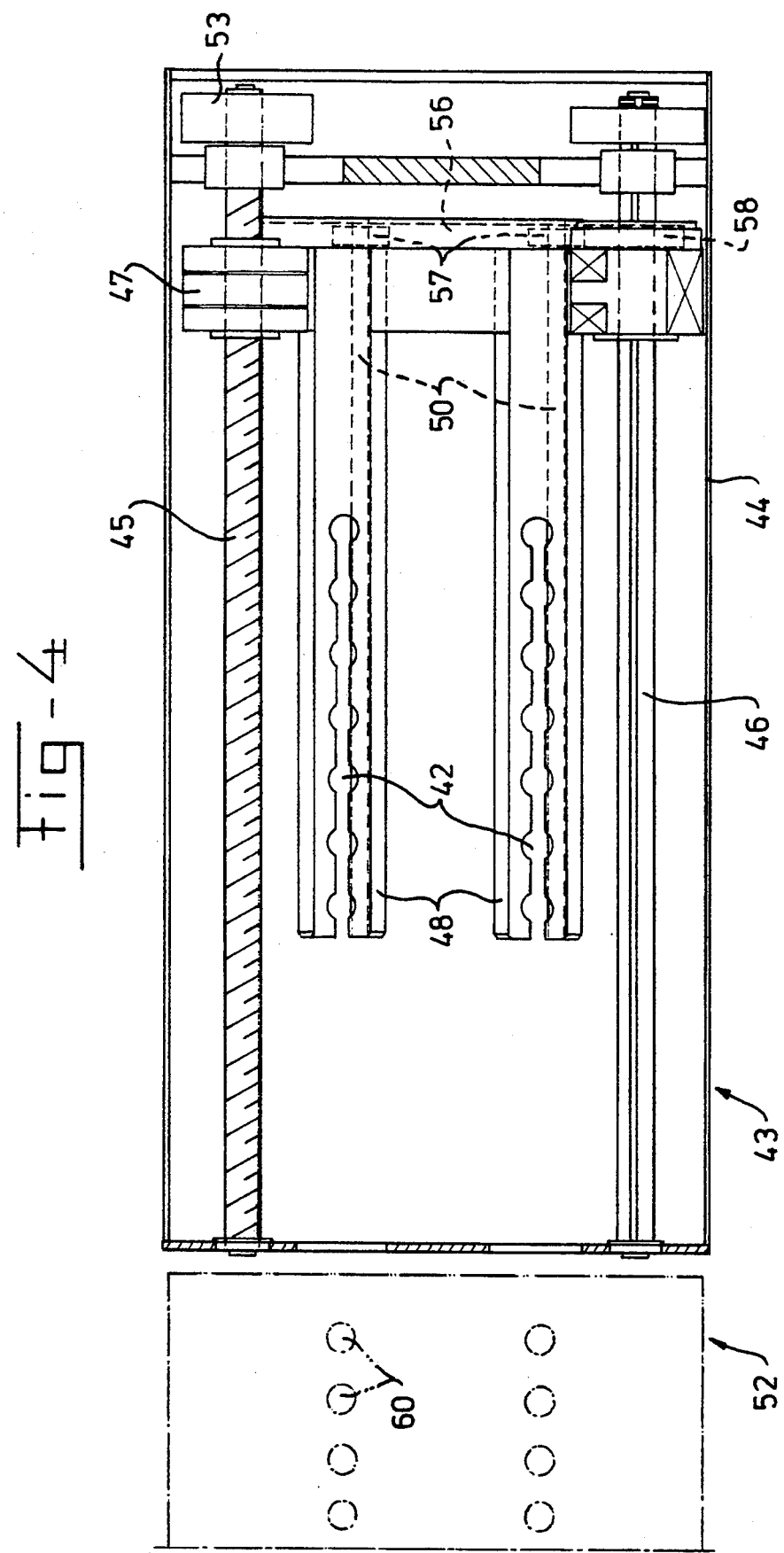
FIG. 4 shows a detail of the lower part of FIG. 2.
Figure 5:
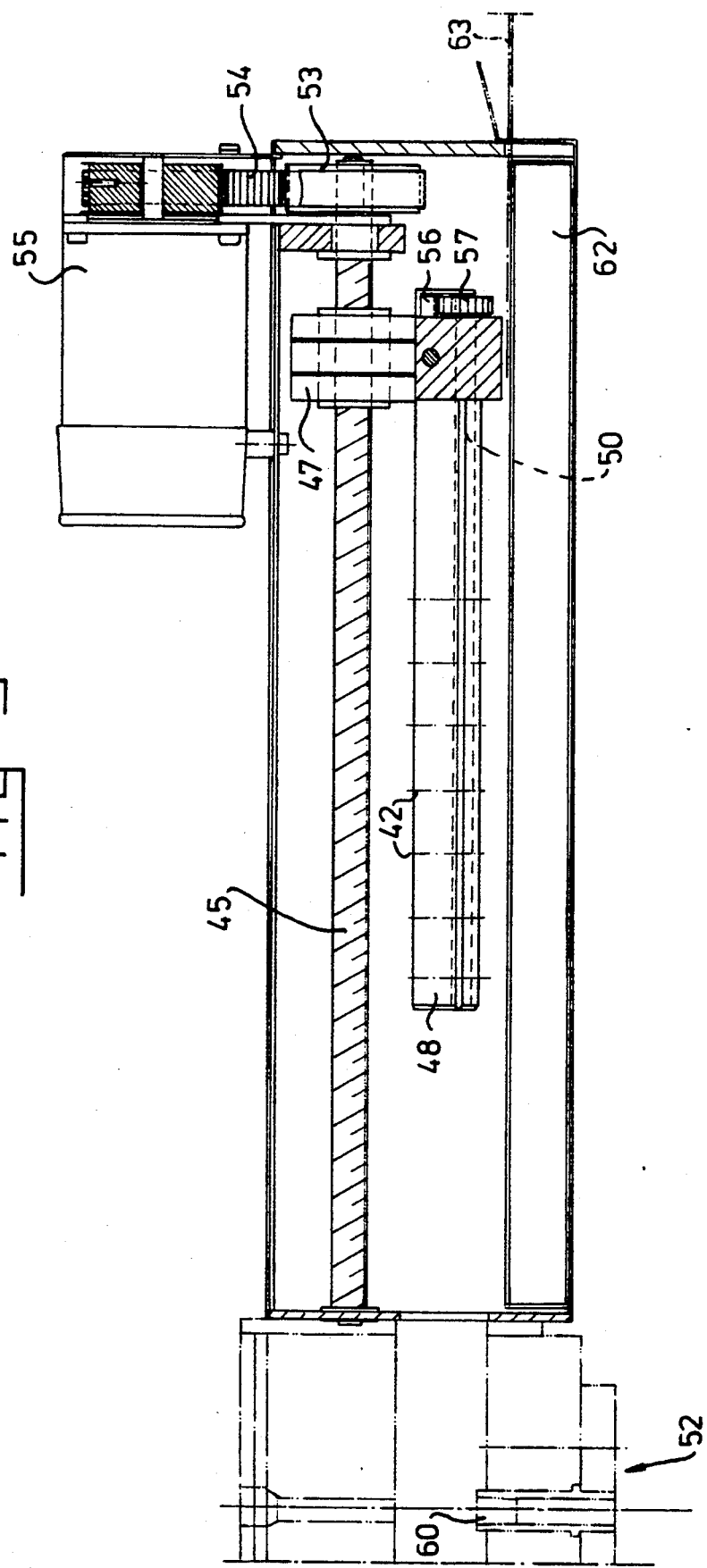
FIG. 5 shows a detail of the lower part of FIG. 3.

FIGS. 4–6 show the transfer device according to the invention. The transfer device is indicated by 43 in its entirety. It consists of a frame 44 in which there are present, supported in a rotatable manner, a conveyor guide 45 and a guide 46 with means for unblocking the receptacles 42. A block 47 can be displaced in these guides. Projecting from this block there are two holders 48 in which the receptacles 42 are arranged. As can be seen from FIG. 2, the free passage of the receptacles is obstructed by a rotatable rod 50 which is depicted in FIGS. 4 and 5 by means of dashed lines. Conveyor guide 45 is provided with a screw thread which engages with a fixed nut which is present in block 47. By rotating shaft 45, block 47 and thus the holders 48 can move from right to left. Indicated by 52, by means of dashed lines, is the mould in device 1, into which the pellets have to be placed in order to be subsequently melted and injected. Shaft 45 is driven via pulley 53 with the aid of a belt 54 by stepping motor 55. This enables accurate determination of the position of receptacles 42 below the tubes 32, 33 in FIG. 2, and filling the holder in a stepwise manner. Rods 50 are linked to one another via a pinion 57 by means of a rack 56. A rack 56 is engaged by a pinion 58 which is arranged in a displaceable, but torsion-proof manner on guide 46 in block 47. By rotating the end of rod 50, for example pneumatically, rack 56 is actuated and thus the rods 50 are rotated by a quarter turn from the horizontal position shown in FIG. 6, in such a way that the receptacles 42, as shown in FIG. 2, are unblocked, which allows the pellet resting on the flattened part of shaft 50 to drop down into the openings 60 in mould 52.

The transfer device is provided with a dust bin 61, in which a drawer 62 is disposed which, for removal purposes, can be covered from above by a slide 63, so that no further dust is produced upon removal. The transfer device described hereinabove is filled by successive stepwise movement of the receptacles 42 underneath the tubes 33, 34. After having been filled, the rods 50 during this process being held back at all times in the position depicted in FIG. 6, the holders in FIG. 4 are moved to the left, until the receptacles 42 are positioned above the openings 60. By actuating the rack 56, the rods 50 are tipped by a quarter turn, as a result of which the receptacles 42 are unblocked and one or more pellets per receptacle 42 can drop into the cavities 60. Subsequently, the holders are moved to the right again. This ensures that the holders are exposed as little as possible to the warm part of the device for melting and injecting.

FIGS. 7 and 8 depict a modified drive for the drum-shaped member 18, which makes it possible to provide further removal of dust and grit and to increase further the reliability of the egress of the pellets. In this design, the drum-shaped member 18 is no longer supported by a belt but is accommodated between a series of lamellae arranged in parallel, which are indicated by reference number 70. Extending through these lamellae, there are arranged two support rollers 71 and 72, support roller 71 being driven via a belt 73 by a motor 74. The V-shaped ends 75 of the rollers 71 and 72, respectively, engage in grooves 76 which are disposed in the drum-shaped member 18. Lamellae 70 extend, as can be seen from the left-hand part of FIG. 7, over a relatively large height, so that the egress location of the pellets is situated above the centre line of the drum. As a result, pellets having different diameters can be aligned with one and the same drum. As can be seen from FIG. 8, there is a small spacing between the lamellae 70, which, on the one hand, is such that the pellets can never move or jam in between these, but on the other hand is so large that all dust and grit does move between them and can be removed at the underside of the lamellae. During operation, the lamellae do not touch the drum-shaped member 18, but only form the outer boundary thereof for the pellets.

Although the invention has been described hereinabove with reference to a preferred embodiment, it should be understood that this can be subjected to numerous modifications which will be obvious to those skilled in the art, without moving outside the scope of the present application.

Although the invention, as described hereinabove, is used to feed plastic pellets to a melting and injection device, it should be understood that this invention can generally be used for feeding cylindrical bodies to any processing device.

I claim:

1. System for metered feeding of cylindrical bodies from a stock to a processing machine, comprising:
    a device for holding said stock;
    a device for aligning the cylindrical bodies coming from the stock;
    a transfer device to move the cylindrical bodies to the processing machine; and
    a device for metered feeding of the cylindrical bodies to said transfer device; wherein:
    the device for aligning the cylindrical bodies coming from the stock comprises a rotatable drum-shaped member, consisting of a number of bars which are disposed in the form of a ring and whose longitudinal centre line is essentially parallel to a longitudinal centre line of the drum, there being a spacing between the bars, which corresponds to a thickness of the cylindrical bodies, a rotational centre line of the drum-shaped member being essentially horizontal, and screening means being disposed near the bottom half of the drum-shaped member and adjoining the latter, an inlet for cylindrical bodies being disposed near a centre of the drum-shaped member and an outlet for cylindrical bodies at the circumference of the bars, together with a motor for driving the drum-shaped member in a rotary manner.

2. System according to claim 1, wherein the screening means comprise a belt corevolving with the drum.

3. System according to claim 2, wherein the belt is the drive belt.

4. System according to claim 1, wherein the screening means comprise a stationary lattice, arranged along the circumference of the drum.

5. System according to claim 4, wherein the stationary lattice comprises a number of lamellae spaced with respect to one another.

6. System according to claim 4, wherein drive and support rollers (71, 72) are disposed for driving the drum.

7. System according to claim 1, wherein dust exhaustion means are present near the outlet of the drum-shaped member.

8. System according to claim 1, wherein the transfer device comprises a displaceable holder with accommodating means, which accommodating means comprise a continuous openings, which is situated near the underside thereof, extends mainly in a vertical direction, and is provided with a displaceable closure.

9. System according to claim 8, wherein there are present in the holder various aligned accommodating means and wherein the closure comprises an elongated rotatable member which extends perpendicularly with respect to a centre line of the openings and has a circumference which is not rotationally symmetric with respect to said continuous openings.

10. System according to claim 8, wherein the holder can be displaced along a rod guidance system, means being present in the rod guidance system for displacing the holder as well as means for unblocking or blocking the continuous openings of the accommodating means of the holder.

* * * * *